Figure 1:
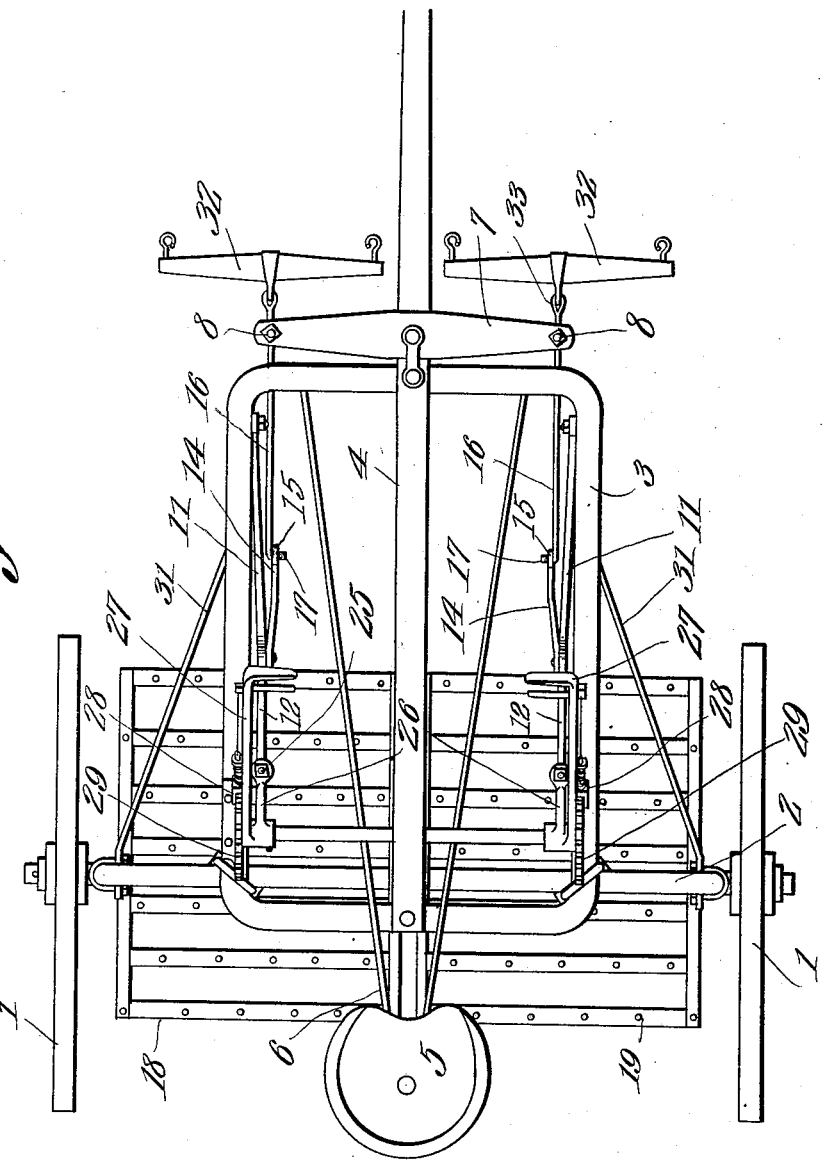

J. P. HARPER.
HARROW.
APPLICATION FILED APR. 5, 1911.

1,008,142.

Patented Nov. 7, 1911.
2 SHEETS—SHEET 1.

Witnesses
J. P. Tomlin
L. H. Wiley

Jacob P. Harper
Inventor,
by C. A. Snow & Co.
Attorneys.

J. P. HARPER.
HARROW.
APPLICATION FILED APR. 5, 1911.
1,008,142.
Patented Nov. 7, 1911.
2 SHEETS—SHEET 2.
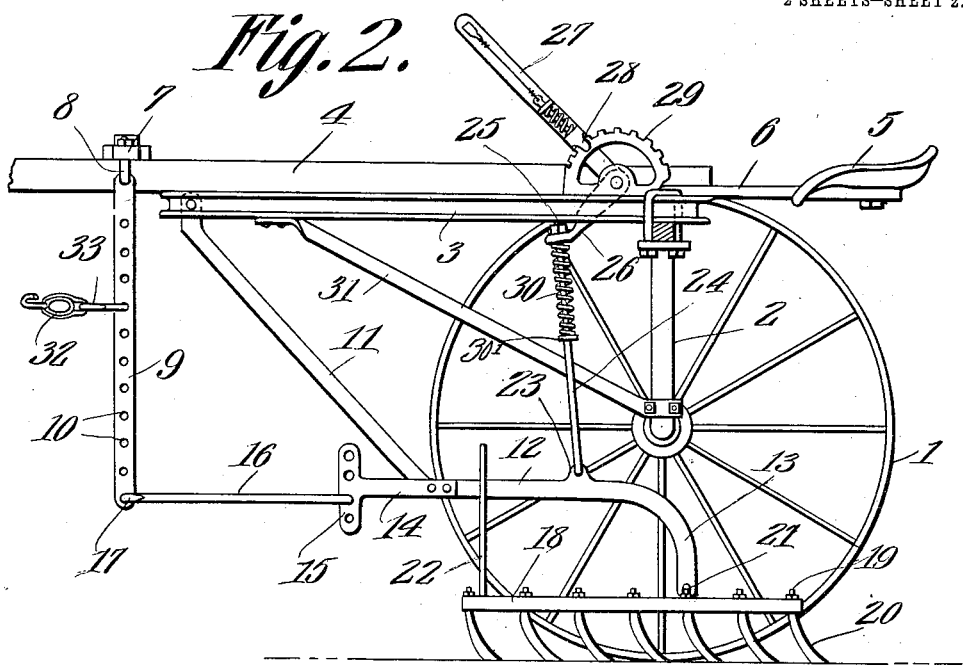
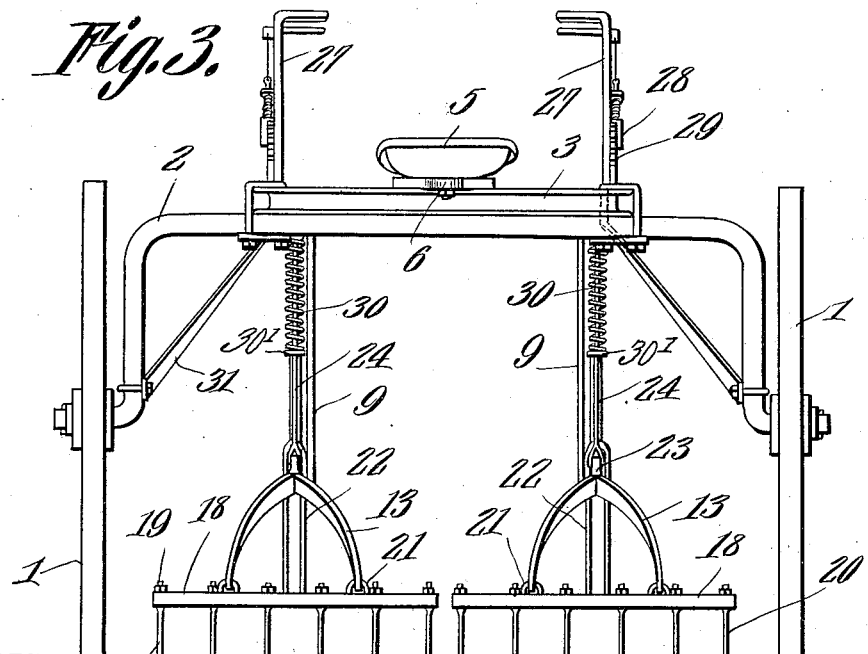
Witnesses
Jacob P. Harper Inventor,
by C. A. Snow & Co.
Attorneys.

UNITED STATES PATENT OFFICE.

JACOB P. HARPER, OF BRUCEVILLE, INDIANA, ASSIGNOR OF ONE-FIFTH TO ISAAC LYONS, ONE-FIFTH TO SAMUEL LYONS, AND ONE-FIFTH TO DANIEL H. MAHONEY, ALL OF VINCENNES, INDIANA.

HARROW.

1,008,142.  Specification of Letters Patent.  Patented Nov. 7, 1911.

Application filed April 5, 1911. Serial No. 619,128.

*To all whom it may concern:*

Be it known that I, JACOB P. HARPER, a citizen of the United States, residing at Bruceville, in the county of Knox and State of Indiana, have invented a new and useful Harrow, of which the following is a specification.

This invention relates to riding harrows and has, for one of its objects, the provision of means whereby the draft can be utilized for forcing the teeth of the harrow into the soil, there being adjustable connections between each harrow section and the trees whereby the depth of the cut can be regulated irrespective of the nature of the soil being worked.

Another object is to provide harrow sections so mounted as to readily tilt about axes extending transversely of the machine so as to conform readily to any irregularities in the contour of the surface over which the sections are drawn.

A further object is to provide a machine of this character which is light and durable in construction and the harrow sections of which can be shifted easily by the driver so as to move into or out of engagement with the soil, said means including cushioning devices designed to exert a constant pressure upon the harrow sections so as to hold them at all times yieldingly in contact with the soil.

With the foregoing and other objects in view which will appear as the description proceeds the invention resides in the combination and arrangement of parts and in the details of construction hereinafter described and claimed it being understood that changes in the precise embodiment of the invention herein disclosed can be made within the scope of what is claimed without departing from the spirit of the invention.

In the accompanying drawings the preferred form of the invention has been shown.

In said drawings: Figure 1 is a plan view of the harrow. Fig. 2 is a side elevation thereof, the arched axle being shown in section and the near wheel removed. Fig. 3 is a rear elevation of the machine.

Referring to figures by characters of reference 1 designates supporting wheels carrying an arched axle 2 on which a frame 3 is bolted or otherwise secured, this frame being preferably oblong, as shown in Fig. 1 and having a centrally disposed tongue 4 secured thereto and extending from front to rear thereof, the driver's seat 5 being supported back of the tongue by a strip 6 secured to the tongue and frame. A double tree 7 is mounted on the tongue 4 in front of the frame 3 and has an eye bolt 8 or the like secured to each end portion thereof and extending downwardly therefrom, each of these eye bolts engaging the upper end of a depending equalizer bar 9 in which is formed a longitudinal series of apertures 10.

A draw bar 11 is secured to the front portion of each side of frame 3 and is inclined downwardly and rearwardly therefrom, said bar terminating, at its lower end, in a rearwardly extending arm 12 having a downwardly curved terminal fork 13. Arm 12 has a forward extension 14 provided with a clevis 15 and a connecting rod 16 is interposed between this clevis and the equalizer bar 9, said rod having terminal hooks 17 adapted to be detachably spaced in any one of the openings 10 and in any one of the openings within the clevis.

A harrow frame, preferably made up of metal tubes, is arranged under each fork 13, as indicated at 18, the cross tubes of the frame being formed with openings for the reception of the threaded stems 19 of harrow teeth 20, these teeth being preferably curved downwardly and rearwardly and having their advancing or convex edges sharpened. The stems 19 are secured within the bars by nuts or the like engaging them. Eyes 21 extend upwardly from the frames adjacent the sides thereof and are pivotally engaged by the ends of the forks 13 so that each harrow frame is thus capable of swinging relative to its fork about an axis extending transversely of the frame. A guide loop 22 is fixedly connected to the front portion of each frame 18 and straddles the arm 12 thereabove so as to prevent lateral displacement of the frame relative to the arm while the harrow is in use.

An ear 23 extends upwardly from each arm 12 and is pivotally engaged by a lifting rod 24 the upper end of which has a head 25 and loosely engages an arm 26 of a controlling lever 27. This lever is fulcrumed on the frame 1 and is provided with a spring pressed dog 28 adapted to engage a toothed segment 29 whereby the lever can be locked in any position to which it may be adjusted. A spring 30 is mounted on the rod 24 and bears upwardly against arm 26 and downwardly against a collar 30' secured to rod 24. It will thus be seen that downward movement of arm 24 will result in the compression of spring 30 and transmission of movement by this spring to the rod 24.

As shown particularly in Figs. 2 and 3, the frame 3 may be braced relative to the arched axle 2 by means of brace strips 31 connecting the front portion of the frame to the lower portion of the arched axle. Any other arrangement of braces may be utilized for increasing the rigidity of the structure. Swingletrees, such as indicated at 32 are adapted to be placed in engagement with the equalizer bars 9 by means of hooks 33 or the like.

Inasmuch as each of the draw bars 11 is pivotally connected at its forward end to the frame 3 and draft is applied to said bar below its pivot, such draft being transmitted from the swingletree 32 through equalizer bar 9 and rod 16, it will be apparent that such draft will tend at all times to force the harrow teeth downwardly in engagement with the soil rather than to lift them out of engagement therewith. By shifting the swingletrees toward or away from the tops of the equalizer bars 9, the pressure of the harrow teeth upon the soil can be varied to meet different conditions of the soil. For example, should the hooks 33 be placed in the uppermost openings 10, the leverage would be reduced to the minimum and the pressure of the harrow teeth upon the soil would be considerably less than when the hooks 23 are placed within the lower openings 10.

As the frames 18 are pivotally connected to the yokes 13, they are free to tilt about axes extending transversely of the machine and thus rest evenly at all times upon the soil and irrespective of any irregularities in the configuration thereof. As the arm 26 continuously presses upon spring 30 while the harrow frames are in their lowered positions, said springs exert constant pressures upon the arm 12, thus holding the harrow teeth at all times yieldingly in contact with the ground. By shifting levers 27 either or both of the harrow frames can be elevated.

What is claimed is:—

1. The combination with a wheel supported frame and a depending equalizer bar movable therewith, of a harrow frame, a draw bar interposed between and pivotally connected to the frames, a connection between the equalizer bar and an intermediate portion of the draw bar, the harrow frame being movable relative to the draw bar about an axis extending transversely of the machine, and a guide device upstanding from the harrow frame and movably engaging the draw bar.

2. The combination with a wheel supported frame and a harrow frame, of a draw bar interposed between and pivotally connected to the frames, said harrow frame being movable relative to the draw bar about an axis extending transversely of the machine, and an upstanding guide fixed relative to the harrow frame and slidably engaging the draw bar.

3. The combination with a wheel supported frame and a harrow frame, of a draw bar interposed between and pivotally connected to the frames, said bars being inclined downwardly and rearwardly from the wheel supported frame, said harrow frame being mounted to swing relative to the bar about an axis extending transversely of the machine, means upon the harrow frame and coöperating with the draw bar for holding said frame against lateral displacement relative to the bar, and means under the control of an operator for exerting a constant yielding pressure upon the bar to maintain the teeth of the harrow frame in engagement with the soil.

4. The combination with a wheel supported frame and a harrow frame, of a draw bar interposed between and pivotally connected to the frames, said harrow frame being mounted to swing relative to the bar about an axis extending transversely of the machine, and means upon the harrow frame and coöperating with the draw bar for holding said frame against lateral displacement relative to the bar.

In testimony that I claim the foregoing as my own, I have hereto affixed my signature in the presence of two witnesses.

JACOB P. HARPER.

Witnesses:
S. F. WAKEFIELD,
THOS. FOREMAN.

---

Copies of this patent may be obtained for five cents each, by addressing the "Commissioner of Patents, Washington, D. C."